United States Patent
Miller et al.

(10) Patent No.: US 8,474,271 B2
(45) Date of Patent: Jul. 2, 2013

(54) SYSTEM AND METHOD FOR HOT AMBIENT AND GRID FREQUENCY COMPENSATION FOR A GAS TURBINE

(75) Inventors: Christopher Edward Miller, Fletcher, NC (US); Philip L. Andrew, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 13/205,006

(22) Filed: Aug. 8, 2011

(65) Prior Publication Data
US 2013/0038072 A1 Feb. 14, 2013

(51) Int. Cl.
*F02C 9/20* (2006.01)

(52) U.S. Cl.
USPC .............................. 60/793; 60/794; 60/39.22

(58) Field of Classification Search
USPC .......... 60/773, 39.27, 794, 793, 39.22, 39.24; 290/52
See application file for complete search history.

(56) References Cited

U.S. PATENT DOCUMENTS

| | | | |
|---|---|---|---|
| 3,973,391 A | 8/1976 | Reed et al. | |
| 5,160,080 A | 11/1992 | Hines et al. | |
| 6,118,187 A * | 9/2000 | Hepner et al. | 290/40 B |
| 6,164,057 A | 12/2000 | Rowen et al. | |
| 6,345,493 B1 * | 2/2002 | Smith et al. | 60/772 |
| 6,718,771 B1 * | 4/2004 | Kopko | 60/773 |
| 6,794,766 B2 * | 9/2004 | Wickert et al. | 290/52 |
| 7,274,111 B2 | 9/2007 | Andrew et al. | |
| 7,293,415 B2 | 11/2007 | Hoffmann | |
| 7,355,297 B2 | 4/2008 | Andrew et al. | |
| 7,380,452 B1 | 6/2008 | Sarshar et al. | |
| 7,406,864 B1 | 8/2008 | Sarshar et al. | |
| 7,422,414 B2 | 9/2008 | Fujii et al. | |
| 7,578,658 B2 | 8/2009 | Larsen | |
| 7,608,938 B2 * | 10/2009 | Andrew et al. | 290/52 |
| 7,681,401 B2 | 3/2010 | Ziminsky et al. | |
| 2003/0011199 A1 | 1/2003 | Wickert et al. | |
| 2007/0031238 A1 | 2/2007 | Fujii et al. | |
| 2009/0297334 A1 | 12/2009 | Norris et al. | |
| 2010/0032964 A1 * | 2/2010 | Hoffmann et al. | 290/40 B |
| 2010/0198419 A1 | 8/2010 | Sonoda et al. | |

\* cited by examiner

*Primary Examiner* — Andrew Nguyen
(74) *Attorney, Agent, or Firm* — Dority & Manning, P.A.

(57) ABSTRACT

Systems and methods for controlling a gas turbine are disclosed. The gas turbine can include a compressor oversized in airflow capacity and one or variable blade rows to control the airflow into the compressor. The position of the variable blade rows can be controlled according to a nominal variable blade row schedule that is defined to throttle down the variable blade rows to provide nominal flow into the compressor. The positions of the variable blade rows can be adjusted from the nominal positions set forth in the variable blade row schedule pursuant to a request to operate the gas turbine system in either a controlled output mode or in a frequency compensation mode.

12 Claims, 3 Drawing Sheets

SYSTEM AND METHOD FOR HOT AMBIENT AND GRID FREQUENCY COMPENSATION FOR A GAS TURBINE

FIELD OF THE INVENTION

The present disclosure relates generally to gas turbines, and more particularly to a system and method for flexible control and operation of a gas turbine.

BACKGROUND OF THE INVENTION

Gas turbines are widely used in commercial operations for power generation. A gas turbine typically includes a compressor located at the front, one or more combustors around the middle, and a turbine at the rear. The compressor can include multiple stages of compressor blades attached to a rotor. Ambient air, as a working fluid, enters an inlet of the compressor, and rotation of the compressor blades progressively compresses the working fluid. The compressor can include one or more variable blade rows, such as inlet guide vanes (IGVs) and variable stator vanes (VSVs), which can be used to control the flow of ambient air into the compressor.

Some of the compressed working fluid is extracted from the compressor through extraction ports for other use, and the remainder of the working fluid exits the compressor and flows to the combustors. The working fluid mixes with fuel in the combustors, and the mixture ignites to generate combustion gases having a high temperature, pressure, and velocity. The combustion gases exit the combustors and flow to the turbine where they expand to produce work.

Electricity demand typically increases with increases in ambient temperature. Maximizing output of gas turbines at times with increased ambient temperatures is advantageous because of commercial opportunities for significant revenue generation as electricity demand and prices escalate with the ambient temperature. However, the capacity to supply electricity with gas turbines generally decreases as the ambient temperature increases. This is due to the negative influence of increased ambient temperature on density and airflow capacity of the turbine. Thus, for typical gas turbines, increased ambient temperature provides for increased economic opportunity with reduced capacity to fulfill energy demands.

Power generation revenues can also be enhanced by providing electrical power grid frequency stabilization services. For instance, if demand exceeds capacity—due to, for example, too many HVAC units running, the electrical grid can experience an "under-frequency" event. The need for frequency stabilization services has increased due to the rising contribution of renewable sources of energy connected to the grid. In particular, intermittent sources of energy, such as wind turbines and solar panels, can contribute to a transient excess of power applied to the grid, resulting in an "over-frequency" event. For instance, a wind turbine can provide a transient excess of power to the grid due to an increase in wind at the wind turbine site. A photovoltaic array can provide a transient excess of power to the grid as the sun comes out and solar rays are incident on the photovoltaic array. Such transient excess supplies of power can result in over-frequency events. Conversely, as renewable sources of power diminish due to, for instance, low wind speeds or on a cloudy day, an "under-frequency" event can occur, particularly in situations where generation demand exceeds the capacity of assets connected to the grid.

Gas turbines can be operated to provide frequency stabilization services by providing more or less output power to the grid. For instance, gas turbines can be operated to output more power to the grid in response to an under-frequency event. Alternatively, gas turbines can be operated to output less power to the grid in response to an over-frequency event.

The rotational speed of gas turbines is not a parameter that can be adjusted to provide frequency stabilization for the grid. The rotational speed of the gas turbines is synchronized to the frequency of the grid. For instance, the nominal rotational speed for 50 Hz grids is about 3000 RPM, and for 60 Hz grids is about 3600 RPM. To provide frequency stabilization, the output power of gas turbines is typically increased using techniques such as wet compression, automatic over-firing, and adjustment of variable blade rows according to variable blade row schedules that compensate for flow needs without user select-ability. These techniques do not typically provide the user the flexibility to control the output of the gas turbine to provide optimum output for revenue generation.

Thus, a need exists for a system and method that provides flexibility to an operator to control the gas turbine to provide enhanced output for increased revenue generation, or alternatively, to operate the gas turbine to provide frequency stabilization services. A system and method that can reduce the effects of increased ambient temperature on gas turbine output would be particularly useful.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to a method for controlling the output power of a gas turbine. The method includes supplying compressed working fluid from a compressor for use with the gas turbine. The compressor is oversized in airflow capacity. The method further includes providing airflow through one or more variable blade rows into the compressor and receiving a request to operate the gas turbine system in a nominal mode, a controlled output mode or in a frequency compensation mode. When the gas turbine is operated in the nominal mode, the method includes controlling the position of the one or more variable blade rows in accordance with a predetermined nominal variable blade row position schedule. The method includes adjusting the position of the one or more variable blade rows from the nominal positions set forth in the nominal variable blade row position schedule to operate the gas turbine in the controlled output mode or in the frequency compensation mode.

Another exemplary embodiment of the present disclosure is directed to a gas turbine system. The gas turbine system includes a compressor oversized in airflow capacity configured to supply compressed air for use during combustion in the gas turbine and one or more variable blade rows configured to control the airflow rate into the compressor. The variable blade rows are movable between a first position where the one or more variable blade rows provide a maximum airflow rate into the compressor and a second position where the one or more variable blade rows provide a reduced airflow rate into the compressor. The system further includes a controller configured to control the position of the one or more variable blade rows according to a nominal variable blade row position schedule. The nominal variable blade row position schedule specifies nominal positions for the one or more variable blade rows such that the one or more variable blade rows provide a nominal airflow rate into the compressor. The nominal airflow rate is less than the maximum airflow rate into the compressor. Pursuant to a request, the gas turbine system is operated in either a controlled output mode or a frequency compensation mode. The controller is configured to adjust the position of the one or more variable blade rows from the nominal positions specified in the nominal variable blade row schedule to operate the gas turbine system in the controlled output mode or in the frequency compensation mode.

A further exemplary embodiment of the present disclosure is directed to a gas turbine system operable in a nominal mode, a controlled output mode and in a frequency compensation mode. The gas turbine system includes a compressor oversized in airflow capacity configured to supply compressed air for use in combustion in the gas turbine and one or more variable blade rows for controlling the airflow into the compressor. The gas turbine system further includes a controller configured to control the position of the one or variable blade rows according to a nominal variable blade row schedule when the gas turbine system is operated in the nominal mode. The controller is further configured to adjust the position of the one or more variable blade rows from the nominal positions set forth in the nominal variable blade row schedule in response to a request to operate the gas turbine in the controlled output mode or the frequency compensation mode. When the gas turbine system is operated in the controlled output mode, the controller is configured to adjust the position of the one or more variable blade rows to increase or decrease airflow into the compressor to achieve a power output requested by an operator. When the gas turbine system is operated in the frequency compensation mode, the controller is configured to monitor the frequency of an electricity grid and adjust the position of the one or more variable blade rows based at least in part on the frequency of the electricity grid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
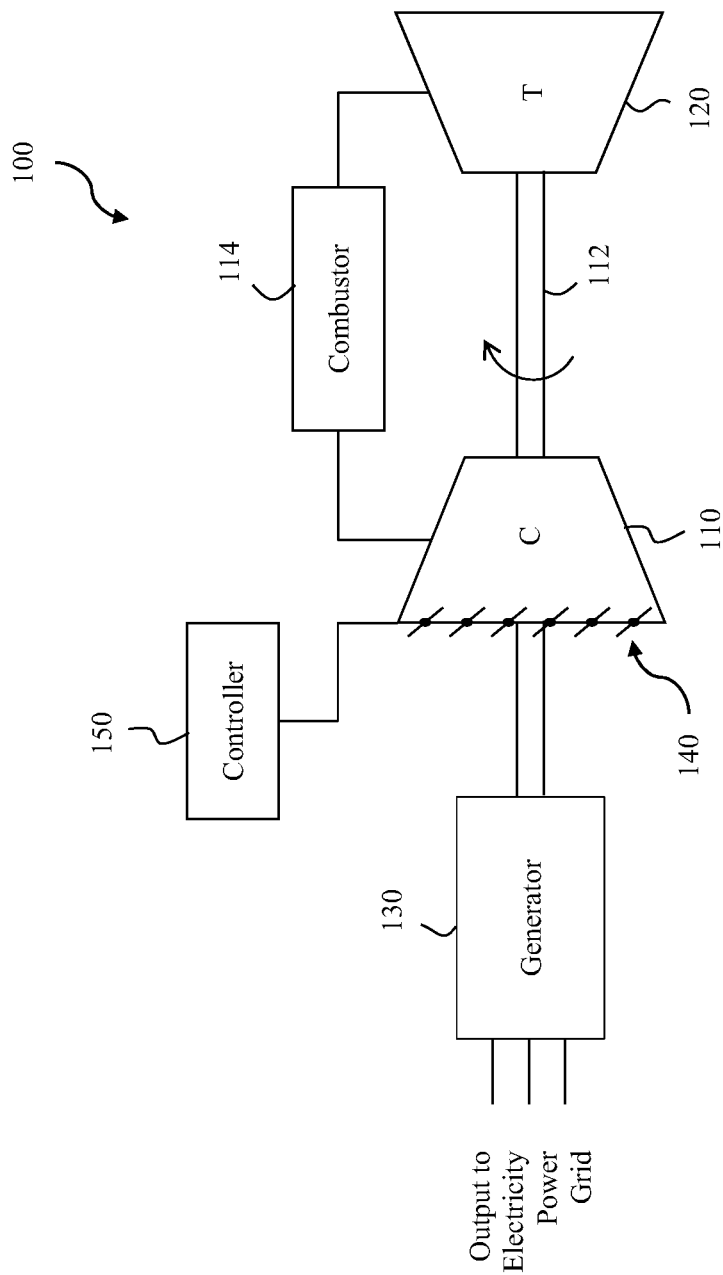
FIG. 1 provides a block diagram of an exemplary gas turbine according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for hot ambient and frequency compensation for a gas turbine. According to aspects of the present disclosure, three modes of controlling a gas turbine are provided for the purpose of either operating the gas turbine system according to a nominal schedule, controlling output for the maximization of revenue generation, or for providing an ancillary service of frequency regulation—an alternative method for revenue generation.

According to particular aspects of the present disclosure, a compressor, oversized in airflow capacity, is used to provide a compressed working fluid, such as air, for combustion in a gas turbine. To provide a desired, design point airflow rate with the oversized compressor, variable blade rows (VBRs), such as IGVs and VSVs, associated with the compressor are closed sufficiently to throttle the flow rate of the compressor down to a desired level. A nominal variable blade row schedule is defined consistent with the variable blade rows throttled down to provide the desired design point level of flow.

An operator can request to operate the turbine in a nominal mode, a controlled output mode, or in a frequency compensation mode. Pursuant to a request to operate the turbine in a nominal mode, the controller controls the position of the variable blade rows in accordance with the nominal variable blade row schedule.

Pursuant to a request to operate the gas turbine in the controlled output mode, the operator will have the ability to request that the gas turbine operate to provide a desired output, such as an increased output. The controller will adjust the position of the variable blade rows from the positions specified in the nominal variable blade row schedule to provide the power output requested by the operator.

Pursuant to a request to operate the gas turbine in the frequency compensation mode the controller for the gas turbine system monitors the frequency of the electrical grid. The controller is configured to modulate the variable blade rows based on the frequency of the electrical grid. For instance, the controller is configured to open the variable blade rows from their nominal position to induce greater airflow and thus provide more power during an under-frequency condition. The controller is configured to close the variable blade rows from their nominal position to induce reduced airflow and thus provide reduced power during an over-frequency condition. Relative to controlled output mode, variable blade row modulation in the frequency compensation mode is expected to be more frequent but smaller in amplitude. Controlling the turbine output through modulation of the variable blade rows when compared to over-firing of the gas turbine provides for reduction of life consumption of hot parts, decreasing maintenance costs.

The gas turbine systems and methods of the present disclosure will have increased marketability by providing an operator the flexibility in determining whether to maximize power generation revenue, for instance, during times with increased ambient temperature or to provide the ancillary service of frequency stabilization. The gas turbine systems and methods of the present disclosure also provide advantages over known gas turbine systems by providing better performance during times with increased ambient temperatures. The frequency compensation mode also provides advantages in market segments and/or regions heavily influenced by renewable energy sources, such as wind energy sources or solar energy sources.

FIG. 1 provides a block diagram of an exemplary gas turbine system 100 according to an exemplary embodiment of the present disclosure. Gas turbine system 100 includes a compressor 110, a combustor, 114, a turbine 120, and a generator 130. Compressor 110 is configured to provide a compressed working fluid for use in combustor 114. The compressed working fluid mixes with fuel in the gas turbine combustor 114, and the mixture ignites to generate combustion gases having a high temperature, pressure, and velocity. The combustion gases expand in the turbine section 120 to produce work to turn rotatable shaft 112. The rotatable shaft 112 drives the generator 130 which in turns generates electrical power. Generator 130 provides the electrical power to the electricity grid.

Compressor 110 includes a plurality of variable blade rows 140, such as inlet guide vanes (IGVs) and variable stator vanes (VSVs) that control the inlet air flow into the compressor 110. The variable blade rows 140 are movable between a first and open position where the variable blade rows 140 provide for a maximum airflow rate into the compressor 110 and a second and closed position where the variable blade rows 140 provide for a reduced airflow rate into the compressor 110. The output power of the gas turbine system 100 can be controlled by adjusting the airflow rate into the compressor 110. For instance, higher output can be achieved by opening the variable blade rows 140 to provide increased airflow into the compressor 110. Similarly, lower output can be achieved by closing or throttling down the variable blade rows 140 to provide decreased airflow into the compressor 110.

Gas turbine system 100 includes a controller 150 that controls, among other parameters of the gas turbine system 100, the position of the variable blade rows 140. In a particular embodiment, the controller 150 receives a signal indicative of the position of the variable blade rows 140. The controller 150 continuously generates a difference signal between the detected variable blade row position and a desired variable blade row position to generate an error signal. The controller 150 adjusts the position of the variable blade rows 140 based on the error signal such that the actual variable blade row position is maintained close to the desired variable blade row position.

According to particular aspects of the present disclosure, compressor 110 is oversized in airflow capacity such that the compressor 110 can provide an increased airflow rate when compared to its nominal or design flow rate. The design cycle of a typical compressor for use with a gas turbine is typically concluded by the experimental mapping of various parameters including an aerodynamic design point for the compressor. Compressors are typically designed to provide an optimum design point airflow rate through the compressor at a particular design point ambient temperature. The design point airflow rate provides for optimum performance of the compressor at the design point ambient temperature. For instance, a compressor may be designed to have a particular optimum design point airflow rate through the compressor at an ambient temperature of 59° F. This temperature is arbitrary, but typically known as the ISO standard day temperature.

In accordance with aspects of the present disclosure, the compressor 110 is oversized in airflow capacity such that the compressor 110 provides an increased airflow rate at the design point temperature relative to the design point airflow rate. For instance, in a particular embodiment, the compressor 110 can be oversized in airflow capacity such that the compressor 110 provides an airflow rate that is approximately 5% to 25%, such as about 15%, greater than the design point airflow rate at 59° F. In this manner, the compressor 110 can accommodate increased airflow rates relative to typical compressors to compensate for density loss during times with increased ambient temperatures.

Because the compressor 110 is oversized in airflow capacity, the variable blade rows 140 can be used to throttle down the compressor 110 so that it operates at the desired optimum airflow rate at the design point temperature. For instance, in a particular embodiment, controller 150 can control the position of the variable blade rows 140 in accordance with a predetermined nominal variable blade row position schedule. The nominal variable blade row position schedule can specify nominal variable blade row positions such that the variable blade rows provide nominal airflow rates into the compressor 110. Because the compressor 110 is oversized in airflow capacity, the nominal airflow rates into the compressor are preferably less than the maximum airflow rates into the compressor 110 so that the compressor 110 operates closer to the design point level of flow at the design point ambient temperature.

As discussed above, the gas turbine system 100 can be operated, pursuant to a request, in either the nominal mode, a controlled output mode, or in a frequency compensation mode. In either the controlled output mode or the frequency compensation mode, the controller 150 adjusts the position of the variable blade rows 140 from the positions specified in the nominal variable blade row position schedule to achieve a desired gas turbine output or to provide frequency compensation services.

For instance, when the gas turbine system 100 is operated in the controlled output mode, controller 150 is configured to adjust the position of the variable blade rows 140 from the nominal position specified in the nominal variable blade row position schedule to increase or decrease the output of the gas turbine system 100. Modulation of the variable blade rows 140 during the controlled output mode is relatively deliberate and can be done in response to a request to provide more or less output. For instance, the natural decrease in airflow capacity observed with increased ambient temperatures can be offset by opening the variable blade rows 140 from the nominal position set forth in the nominal variable blade row schedule. Less frequently, the variable blade rows 140 can be closed from the nominal position set forth in the nominal variable blade row schedule in circumstances where, for instance, there are more economical power generation assets available and there is a need to keep the gas turbine synchronized to the grid.

Figure 2:
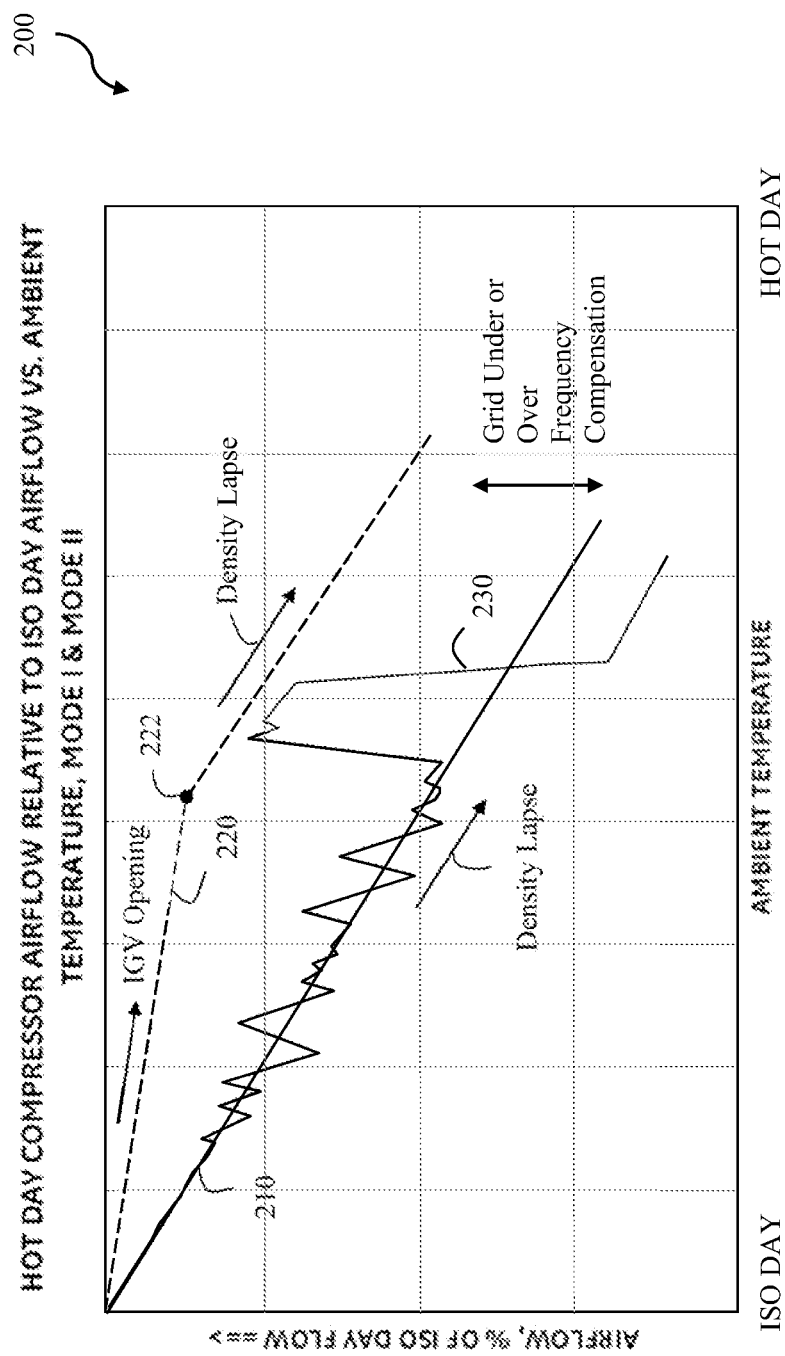
FIG. 2 provides a graphical representation of compressor airflow vs. ambient temperature for a gas turbine system operating in the controlled output mode (Mode I) and the frequency compensation mode (Mode II) according to an exemplary embodiment of the present disclosure.

Referring to the graphical representation 200 set forth in FIG. 2, the airflow capacity of a compressor operating in controlled output mode will be discussed in detail. Curve 210 represents the airflow of compressor operating pursuant in the nominal mode. As illustrated, density lapse occurs in the compressor with increased ambient temperatures, causing the airflow capacity, and thus output, of the compressor to decrease with ambient temperature.

Curve 220 represents the airflow capacity of the compressor being operated in the controlled output mode. As indicated by curve 220, as the variable blade rows open from the positions set forth in the nominal variable blade row schedule, the reduction in airflow due to density lapse in the compressor is reduced until the variable blade rows are fully open at point 222. Once the variable blade rows are fully open, the compressor 110 will experience reduced airflow capacity as ambient temperature increases. As illustrated in FIG. 2, when the gas turbine system 100 is operated in the controlled output mode, the decrease in output associated with increased ambient temperatures can be offset by opening the variable blade rows 140 from their nominal positions.

When the gas turbine system 100 is operated in the frequency compensation mode, the controller 150 for the gas turbine system 100 monitors the grid frequency of the electricity grid. The controller 150 is configured to adjust the variable blade rows 140 from the nominal position specified in the nominal variable blade row position schedule to induce greater airflow and provide more power during an under-frequency condition and to induce reduced airflow and reduced power during an over-frequency condition.

In a particular implementation, a deadband can be specified where no variable blade row modulation occurs in the frequency compensation mode to prevent unnecessary dithering of the variable blade rows 140. For instance, the deadband can include a first threshold and a second threshold. The controller can be configured to adjust the position of the one or more variable blade rows to provide increased airflow into said compressor when the frequency of the electricity grid is less than the first threshold; adjust the position the one or more variable blade rows to provide decreased airflow into said compressor when the frequency of the electricity grid is greater than the second threshold; and maintain the position of the one or more variable blade rows when the frequency of the electricity grid is greater than or approximately equal to the first threshold and less than or approximately equal to the second threshold.

Referring to the graphical representation 200 of FIG. 2, the airflow capacity of a compressor 110 operating in the frequency compensation mode will be discussed in detail. Curve 230 illustrates the modulation of the variable blade rows in response to under- and over-frequency events. As shown, the controller 150 is configured to adjust the variable blade rows 140, and thus airflow into the compressor 110, from the nominal positions specified in the nominal variable blade row position schedule such that the gas turbine system 100 provides frequency compensation services.

Figure 3:
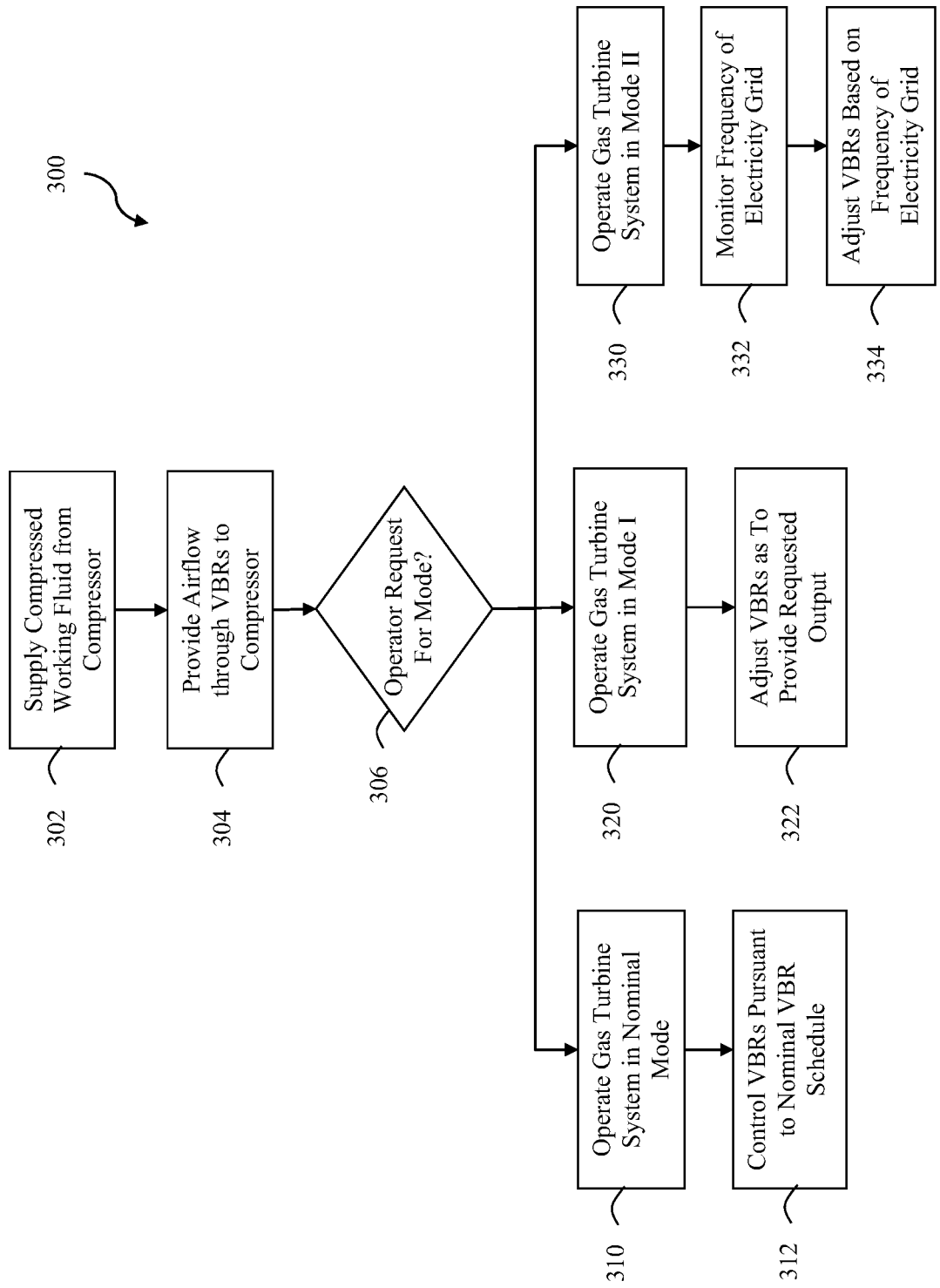
FIG. 3 provides a flow diagram of an exemplary method according to an exemplary embodiment of the present disclosure.

FIG. 3 illustrates a flow diagram of an exemplary method 300 according to an exemplary embodiment of the present disclosure. At 302, the method 300 includes supplying compressed air from a compressor for use in combustion in a gas turbine. According to particular aspects of the present disclosure, the compressor can be oversized in airflow capacity such that the compressor can provide an increased airflow rate at a design point ambient temperature that is greater than the design point airflow rate at the design point ambient temperature. For instance, the compressor can be oversized in airflow capacity such that the increased airflow rate at 59° F. is approximately 5% to 25%, such as about 15%, greater than the design point airflow rate at 59° F.

At 304, the method 300 provides airflow through variable blade rows to the compressor. At 306, an operator can request to operate the gas turbine system in either a nominal mode, a controlled output mode, or a frequency compensation mode. The operator can set the mode of operation during turbine startup or during any other time during operation of the gas turbine. Those of ordinary skill in the art, using the disclosures provided herein, should understand that an operator can request a particular mode of operation at any time during gas turbine operation without deviating from the scope of the present disclosure.

At 310, in response to a request to operate the gas turbine in a nominal mode, the gas turbine 310 is operated in the nominal mode. During the nominal mode, the position of the variable blade rows can be controlled by a controller pursuant to a nominal variable blade row schedule as indicated at 312. The nominal variable blade row schedule can specify nominal positions for the variable blade rows such that the variable blade rows provide a nominal airflow rate into the compressor, typically as a function of ambient temperature. The nominal airflow rate can be a throttled down airflow rate such that the variable blade rows can be opened from the nominal positions to compensate for increased ambient temperature or under-frequency conditions as desired.

If the operator requests operation in the controlled output mode, the method 300 will operate the gas turbine system in the controlled output mode as indicated at 320. When the gas turbine is operated in the controlled output mode, the method 300 at 354 includes adjusting the position of the variable blade rows from the nominal positions set forth in the nominal variable blade row schedule to provide a power output request by the operator. For instance, as discussed above, the method 300 can open the variable blade rows from their nominal position to increase airflow into the compressor to compensate for airflow loss in the compressor due to increased ambient temperature.

If the operator requests operation in the frequency compensation mode, the method 300 will operate the gas turbine system in the frequency compensation mode as indicated at 330. When the gas turbine is operated in the frequency compensation mode, the method 300 includes monitoring the frequency of the electricity grid as shown at 332 and adjusting the position of the variable blade rows from the nominal positions specified in the nominal variable blade row schedule based at least in part on the grid frequency as indicated at 334. For instance, as discussed above, the method 300 can adjust the variable blade rows from the nominal positions specified in the nominal variable blade row position schedule to induce greater airflow and provide more power during an under-frequency condition and to induce reduced airflow and reduced power during an over-frequency condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine system, comprising:
a compressor oversized in airflow capacity configured to supply compressed air for use during combustion in the gas turbine;
one or more variable blade rows configured to control the airflow rate into said compressor, said one or more variable blade rows being movable between a first position wherein said one or more variable blade rows provide a maximum airflow rate into said compressor and a second position wherein said one or more variable blade rows provide a decreased airflow rate into said compressor;
a controller configured to operate the gas turbine system in a nominal mode, a controlled output mode, and a frequency compensation mode, the controller configured to control the position of said one or more variable blade rows according to a nominal variable blade row position schedule when the gas turbine system is operated in the nominal mode, said nominal variable blade row position schedule specifying nominal positions for said one or more variable blade rows such that said one or more variable blade rows provide a nominal airflow rate into said compressor, the nominal airflow rate being less than the maximum airflow rate;

wherein pursuant to an operator request, said gas turbine system is operable in either the controlled output mode or the frequency compensation mode, said controller configured to adjust the position of the one or more variable blade rows from the nominal positions specified in the nominal variable blade row schedule to operate said gas turbine system in the controlled output mode or in the frequency compensation mode, wherein when said gas turbine is operated in the controlled output mode, said controller is configured to adjust the position of said one or more variable blade rows to increase or decrease airflow into said compressor to achieve a power output requested by an operator.

2. The gas turbine system of claim 1, wherein said compressor is oversized in airflow capacity such that said compressor can provide an increased airflow rate at a design point ambient temperature that is greater than the design point airflow rate at the design point ambient temperature.

3. The gas turbine system of claim 2, wherein said compressor is oversized in airflow capacity such that the increased airflow rate at about 59° F. is approximately 5% to 25% greater than the design point airflow rate at about 59° F.

4. The gas turbine system of claim 1, wherein when said gas turbine system is operated in the controlled output mode, said controller is configured to adjust the position of said one or more variable blade rows to increase airflow into the compressor to compensate for airflow loss in said compressor due to increased ambient temperature.

5. The gas turbine system of claim 1, wherein when said gas turbine system is operated in said frequency compensation mode, said controller is configured to monitor the frequency of an electricity grid and adjust the position of said one or more variable blade rows based at least in part on the frequency of the electricity grid.

6. The gas turbine system of claim 5, wherein said controller is configured to:
adjust the position of said one or more variable blade rows to provide increased airflow into said compressor when the frequency of the electricity grid is less than a first threshold;
adjust the position said one or more variable blade rows to provide decreased airflow into said compressor when the frequency of the electricity grid is greater than a second threshold; and
maintain the position of said one or more variable blade rows when the frequency of the electricity grid is greater than or approximately equal to the first threshold and less than or approximately equal to the second threshold.

7. A gas turbine system, the gas turbine system comprising:
a compressor oversized in airflow capacity configured to supply compressed air for use in combustion in the gas turbine;
one or more variable blade rows for controlling the airflow into said compressor; and a controller configured to operate the gas turbine system in a nominal mode, a controlled output mode and in a frequency compensation mode, the controller configured to control the position of said one or variable blade rows according to a nominal variable blade row schedule when the gas turbine system is operated in the nominal mode, said controller being further configured to adjust the position of said one or more variable blade rows from the nominal positions set forth in the nominal variable blade row schedule in response to a request to operate the gas turbine in the controlled output mode or the frequency compensation mode;

wherein when said gas turbine system is operated in the controlled output mode, said controller is configured to adjust the position of said one or more variable blade rows to increase or decrease airflow into said compressor to achieve a power output requested by an operator;
wherein when said gas turbine system is operated in said frequency compensation mode, said controller is configured to monitor the frequency of an electricity grid and adjust the position of said one or more variable blade rows based at least in part on the frequency of the electricity grid.

8. The gas turbine system of claim 7, wherein said nominal variable blade row position schedule specifies nominal positions for said one or more variable blade rows such that said one or more variable blade rows provide a nominal airflow rate into said compressor, the nominal airflow rate being less than a maximum airflow rate into said compressor.

9. The gas turbine system of claim 7, wherein said compressor is oversized in airflow capacity such that said compressor can provide an increased airflow rate at the design point ambient temperature that is greater than the design point airflow rate at the design point ambient temperature.

10. The gas turbine system of claim 9, wherein said compressor is oversized in airflow capacity such that the increased airflow rate at about 59° F. is approximately 5% to 25% greater than the design point airflow rate at about 59° F.

11. The gas turbine system of claim 7, wherein when said gas turbine is operated in said controlled output mode, said controller is configured to adjust the position of said one or more variable blade rows to increase airflow into said compressor to compensate for airflow loss in said compressor due to increased ambient temperature.

12. The gas turbine system of claim 10, wherein when said gas turbine is operating in said frequency compensation mode, said controller is configured to:
adjust the position of said one or more variable blade rows to provide increased airflow into said compressor when the frequency of the electricity grid is less than a first threshold;
adjust the position said one or more variable blade rows to provide decreased airflow into said compressor when the frequency of the electricity grid is greater than a second threshold; and
maintain the position of said one or more variable blade rows when the frequency of the electricity grid is greater than or approximately equal to the first threshold and less than or approximately equal to the second threshold.

* * * * *